United States Patent [19]

Pauluis

[11] 4,072,469
[45] Feb. 7, 1978

[54] INTERCONNECTION ARRANGEMENT FOR A DUAL TEMPERATURE ISOTOPE EXCHANGE

[75] Inventor: Gerard J. C. A. Pauluis, Brussels, Belgium

[73] Assignee: Atomic Energy of Canada Limited, Ottawa, Canada

[21] Appl. No.: 697,221

[22] Filed: June 17, 1976

[30] Foreign Application Priority Data

Sept. 9, 1975 Canada .................................. 235094

[51] Int. Cl.² .............................................. B01D 59/33
[52] U.S. Cl. ......................................... 23/260; 23/263; 23/284; 23/270.5 W; 423/580; 165/106; 165/111
[58] Field of Search ......... 23/284, 260, 263, 270.5 W; 423/580 H; 165/106, 111

[56] References Cited

U.S. PATENT DOCUMENTS

| | | | |
|---|---|---|---|
| 3,142,540 | 7/1964 | Sperock | 23/260 |
| 3,386,502 | 6/1968 | Rostaing | 23/260 X |
| 3,431,080 | 3/1969 | Rostaing | 423/580 H X |

Primary Examiner—James H. Tayman, Jr.
Attorney, Agent, or Firm—J. R. Hughes

[57] ABSTRACT

An interconnection arrangement for a dual temperature isotope exchange process of the type having a first stage made up of a cold tower, a hot tower, a humidifier and a dehumidifier with a recycled gas stream passing in countercurrent isotope exchange relationship with a liquid stream in the said towers and a similar second stage, said first stage having heat exchange means between humidifier and dehumidifier formed of humidifier and dehumidifier recycle loops passing through a heat exchanger, the improvement comprising means for feeding a portion of the liquid passing in the dehumidifier recycle loop of the first stage to the top of the humidifier of the second stage, means for feeding the liquid passing through the humidifier of the second stage back to the dehumidifier recycle loop of the first stage, and means for passing a portion of the liquid from the first stage in heat exchange relationship with the liquid in a dehumidifier recycle loop of the second stage.

1 Claim, 3 Drawing Figures

INTERCONNECTION ARRANGEMENT FOR A DUAL TEMPERATURE ISOTOPE EXCHANGE

This invention relates to a dual temperature isotope exchange process and more particularly to an interconnection arrangement in a multiple dual temperature isotope exchange process.

A dual temperature isotope exchange process of the cold feed type is described in Canadian Pat. No. 574,293 issued Apr. 21, 1959 to Atomic Energy of Canada Limited. A stage interconnection arrangement is shown for a cold feed system in Canadian Pat. No. 785,690 issued May 21, 1968 to Canadian General Electric Company.

A hot feed method has been described in Canadian Patent Application No. 195,387 of Mar. 19, 1974 by G. J. C. A. Pauluis and A. I. Miller. It is shown in this patent application that the extraction of a GS (Girdler-Sulphide) heavy water plant could be increased by injecting the feed water hot to the bottom of the first stage hot tower and stripping this hot water of its deuterium content by contact with a countercurrent flow of gas. Liquid flowing down the hot tower, above the feed injection point was recycled to the top of the cold tower thus providing distilled water in the hot and cold towers. This was to reduce the foaminess of the water in the first stage.

The object of the present invention is to improve the performance of a multistage dual temperature process by applying the hot feed technique to the feed arrangement of the higher stages (that is the stages fed with a liquid at deuterium concentration substantially above natural concentration), together with using a heat recovery system integrated between the various stages.

It is another object of this invention to provide purer stream of liquid in the cold-hot tower pairs of the upper stages by a redirection of the upper stages feed streams so that they do not contaminate the liquid circulating in the cold-hot tower pairs of these upper stages.

It is another object to increase the extractive duty of these upper stages by taking advantage of the hot feed effect.

It is a further object to reduce the heat exchange area required by liquid interconnected stages by transferring by indirect contact part or all of the sensible heat contained in the liquid stream leaving the hot towers of the upper stages to the humidifier recycle liquid in the first stage.

These and other objects of the invention are achieved by an interconnection arrangement for a dual temperature isotope exchange process of the type having a first stage made up of a cold tower, a hot tower, a humidifier and a dehumidifier with a recycled gas stream passing in counter-current isotope exchange relationship with a liquid stream in the said towers and a similar second stage, said first stage having heat exchange means between humidifier and dehumidifier formed of humidifier and dehumidifier recycle loops passing through a heat exchanger, the improvement comprising means for feeding a portion of the liquid passing in the dehumidifier recycle loop of the first stage to the top of the humidifier of the second stage, means for feeding the liquid passing through the humidifier of the second stage back to the dehumidifier recycle loop of the first stage, and means for passing a portion of the liquid from the first stage in the heat exchange relationship with the liquid in a dehumidifier recycle loop of the second stage. The invention also encompasses an interconnection system wherein a plurality of cold-hot tower pairs feed a single second stage.

In drawings which illustrate an embodiment of the invention,

Figure 1:
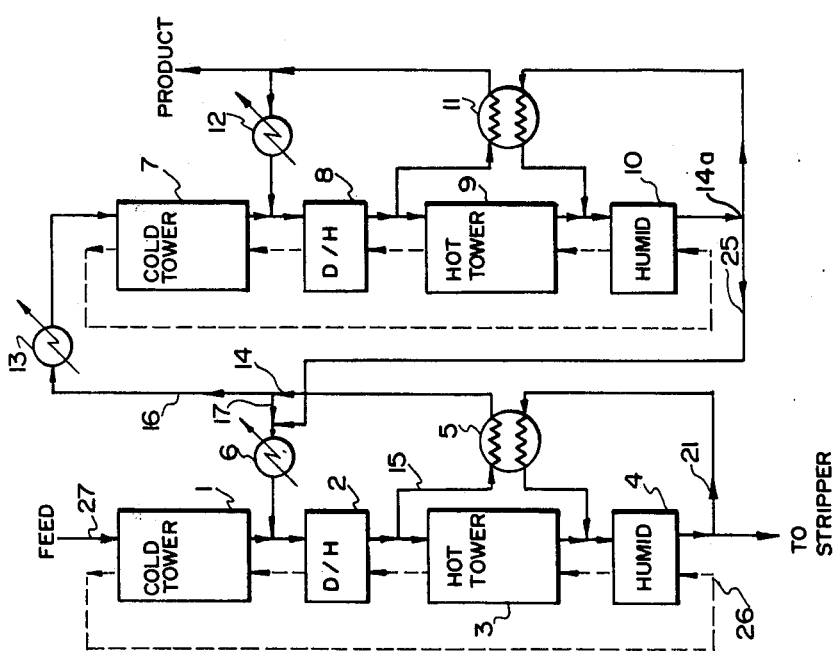
FIG. 1 shows a prior art two stage hydrogen sulphide water process.

Referring to FIG. 1 a prior art conventional two stage hydrogen sulphide-water (GS) process is shown. The flow sheet has been simplified to the essential elements, and does not describe such elements as pumps, blowers, gas equilibration lines between stages, or heating mode (direct steam injection of indirect humidifier recycle heating via steam heaters); it is understood that such elements and other are necessary for the operation of the plant but not for the comparison of the processes and have thus been eliminated from the flow sheet. The system generally comprises a cold tower 1, dehumidifier 2, a hot tower 3, a humidifier 4 and a recycled gas ($H_2S$) stream 26 passing through these in countercurrent isotope exchange relationship with a liquid stream (water) 21 with a cold liquid feed supply 27.

In the prior art process, enriched liquid 15 is drawn from the bottom of the first stage dehumidifier 2, exchanges its heat content in heat exchanger 5 with liquid 21 from the bottom of the humidifier 4, then is split at point 14 in two streams. One, stream 17, is then mixed with liquid 25 from the bottom of unit 10 and passing through a cooler 6 returns to the top of dehumidifier 2. The other stream 16 (the feed to the second stage), is cooled through 13 and fed to the top of the cold tower, second stage 7. In the cold tower 7 and the dehumidifier 8 of the second stage, the liquid is further enriched and a portion of it can be taken from the dehumidifier recycle loop as product to a further enriching stage or to another process. In units (hot tower and humidifier) 9 and 10, the liquid is then stripped of its deuterium content and part 25 of the improverished liquid is returned from the bottom of 10 to the first stage after split 14a.

There are variations in this interconnection scheme of liquid interconnected systems (see for example Canadian Patent No. 785,690) but always the liquid fed to the top of cold tower 7 comes from the same body of liquid that flows down the preceeding stage. Also the major fraction of the liquid flowing down the hot tower, stage 2 is always returned to the previous stage, directly or after passing through the humidifier of the second stage. Impurities entrained or dissolved, in the first stage liquid are thus brought to the second stage.

Figure 2:
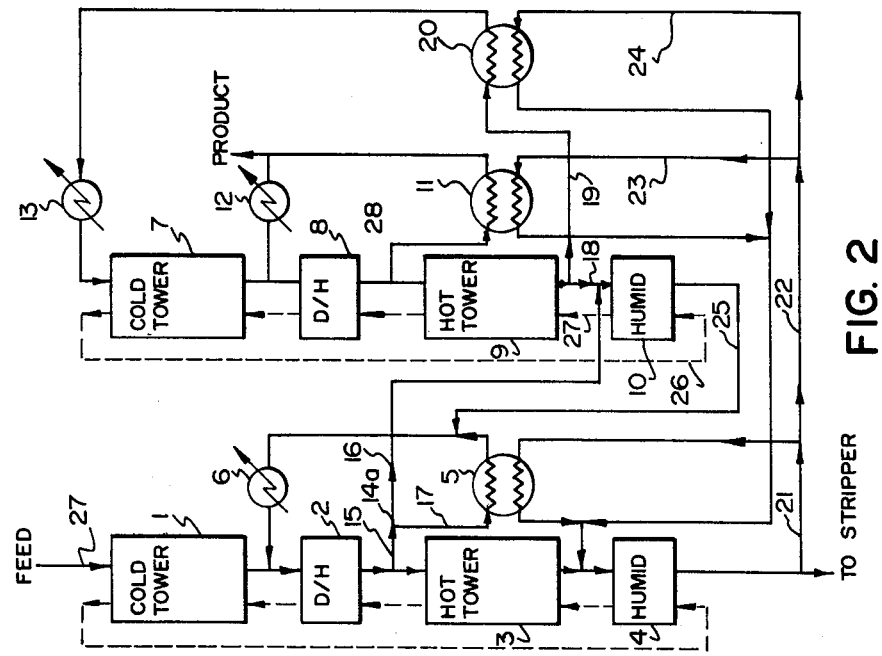
FIG. 2 shows the interconnection system according to the invention applied to two stages.

Referring to FIG. 2, the process according to the invention is shown. It represents a two stage cold feed process, but it will be realized that the improvement applies equally well to hot feed processes, with at least two stages. The same simplifications apply as in the description of the conventional process flow sheet.

The first stage enriched liquid is drawn at the bottom of dehumidifier 2, but is now split at 14a, before heat exchanger 5. A portion 16, of the liquid 15, required to heat the gas in the second stage is directed to the top of humidifier 10, typically this portion represents three times the liquid flow in 7, the exact ratio depending on the temperature and pressure conditions in the second stage. Before entering unit (humidifier) 10, stream 16 is mixed with additional liquid 18, which is essentially the difference in humidity (that is liquid vapour), of the hot gas leaving humidifier 10 and the cold gas leaving cold tower 7 minus the product flow. The liquid flowing down the humidifier 10, gives both heat and deuterium to the gas and can then be returned to the first stage after exchanger 5.

The gas leaving the second stage humidifier 10 contains an important humidity fraction, which is condensed in dehumidifier 8, and flows down the hot tower 9. At the bottom of the hot tower 9, the liquid is split. The main fraction 19 being recycled to the top of cold tower 7 after being cooled in heat exchanger 20 and cooler 13. In this arrangement the liquid flowing down the cold-hot pair of the second stage continuously receives vapour from humidifier 10 and purges the excess liquid 18. It is thus continuously distilled and purified.

Because the flow of liquid (16+18) is so much larger than the flow of liquid in tower 7, the enrichment of the gas in humidifier 10 is easy and the extractive capacity of the upper stage is larger than in the conventional process (hot feed effect).

Under equal conditions of temperature, pressure and gas flows, the flows of liquids in the dehumidifiers and humidifiers in the two processes must be roughly the same. But because in the improved process a portion 16 of stream 15 is removed from the dehumidifier recycle flow in the first stage, there is not enough sensible heat left in the remaining fraction, stream 17, to heat the whole stream 21 from the bottom humidifier 4. Thus, in the improved process a portion 22 of stream 21 is directed to the second stage heat exchangers. Stream 22 is split in portions 23 and 24 exchanging heat respectively with the upper stage dehumidifier loop 28 in the heat exchanger 11 and with the upper stage recycled liquid in heat exchanger 20. However because the flow of humidifier loop liquid 21 is the same in the conventional and the improved process, one realizes that the total heat exchange surface, of the heat exchangers 5, 11 and 20 in the improved process is the same (for the same temperature approach) as the heat exchange area of heat exchanger 5 alone in the prior art. The improved process thus saves a heat exchanger area equal to the second stage heat exchanger 11 of the prior art. This is an important advantage of the hot feed principle when applied to the upper stages of a dual temperature process which does not exist for the first stage alone.

The upper stages can be easily operated at conditions of pressure and temperature different from the first stage. It may then be necessary to add heat to the upper stages. This can be done by indirect heating either of stream 16 or of stream 18 then with partial vaporization. In the latter case the vapour will be reinjected at the bottom of the hot tower 9 or a few plates below, in the humidifier 10.

It will be realized that this interconnection scheme applies as well to an enrichment process with more than two stages. In that case the heat exchanger area saving is the sum of all the upper stages humidifier-dehumidifier heat exchangers.

Figure 3:
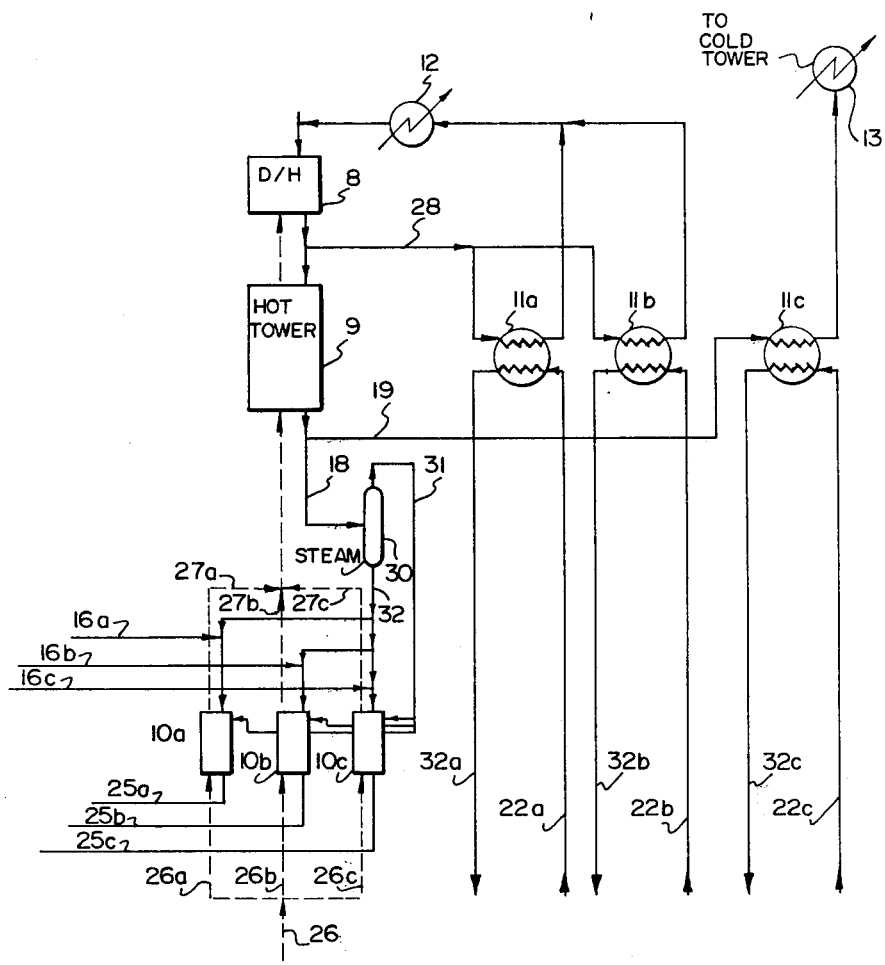
FIG. 3 shows the interconnection system as applied to a plurality of stages.

It will also be realized that a plurality of lower stages can feed the same upper stage and this is illustrated in FIG. 3. The heat exchangers 11 and 20, will then be made up of a series of units in parallel arrangement 11A, 11B, 11C . . . to accomodate the humidifier recycle streams 22A 22B, 22C . . . In that case also the various streams 16A, 16B, 16C . . . can be joined together to form stream 16, and stream 25 from the bottom humidifier 10, split back into streams 25A, 25B, 25C. This however can present problems of redistribution as stream 25 is large and a maldistribution can affect the performance of the lower stages. Also if one of the lower stages has to be shut down, there results a complex problem of heat and flow distribution to the upper stage. Indeed not only is the splitting of stream 25 always affected, but then, either the remaining stages do not increase their product flows 16A, 16B . . ., and additional heat is necessary in the upper stage, or streams 16A, 16B . . . are increased (to make up the same flow value 16 as when all first stages are on), and then additional heat is required in the first stage, unless the humidifier recycle splits of streams 21A 21B . . . are modified so that new fractions can take over the amount of heat which would have been recuperated by the stage shut down, but this is complex.

There is however a preferred connection mode in the case of a plurality of lower stages connected to the same upper stage. The key element is that instead of mixing the various streams 16A, 16B, 16C, before humidifier 10 and then splitting the return 25 in as many fractions, it is more efficient to split the gas stream 26, run the various fractions 26A, 26B, 26C through a series of parallel arrangement of humidifier sections 10A, 10B, 10C . . . and then join together the gas streams 27A, 27B, 27C from the tops of these humidifiers before entering the bottom of the hot tower. It will be realized that the number of lower stages feeding one upper stage can be different. However the ratio 3/1 is very attractive as the dehumidifier recycle flow 28, is roughly twice the main recycle flow 19, and this allows a simple disposition of the heat exchangers in three identical units 11A, 11B, 11C to redistribute the heat from the upper stage to the lower stages. The three feed flows 16A, 16B, 16C are about the same as the recycle flow 19.

The humidifier sections 10A, 10B, 10C can be disposed in parallel inside the same pressure envelope or made of separate pressure vessels.

The reasons why this arrangement is better than by mixing the feed flows 16A, 16B 16C, is that any misadjustment of the major split, the gas flows 26A, 26B, 26C, only affects the liquid/gas ratio in the humidifiers 10A, 10B, 10C. The performance of these is relatively insensitive to such variations, when, in the other connection mode, maladjustment affects the whole sensitive lower stages.

In the preferred design, the other splits affect only condensate return stream 18, which is only about one-third the flow of stream 19, maladjustments there are thus of minor importance. In FIG. 3, a reboiler 30 is used for transferring heat to the upper stage. The resulting steam 31 is split before being fed into the humidifier sections 10A, 10B, 10C. One might as well have preferred to feed 31 to the bottom of the hot tower 9, however the former arrangement presents more versatility for process control as occasional dissymetries in performance can be compensated by adjusting gas flow ratios and, or, steam flows in the humidifier sections. The excess liquid 32 from the reboiler is also split and fed to the three humidifiers.

Another heat injection system would have been to provide three separate steam heaters on 16A, 16B, 16C. The choice between the two heating systems depends on the amount of heat required. The reboiling capacity of 30 being limited by the flow of 18.

The arrangement of the humidifiers in parallel presents a further advantage when one lower stage is down. Indeed stream 19 can then be redirected to the humidifier corresponding to the stage shut off, and the liquid from the bottom of this humidifier fed back to cooler 13, the flows from, and to, the two remaining lower stages being unaffected, excepted for a possible switching of heat exchanger (e.g. if the stage down is A, then 22C has to be redirected to heat exchanger 11A). The only flows trimmed are 31 and 32 and occasionally 26. The additional piping and valving for this operation with stages down is rudimentary.

By providing lines normally closed across the liquid feeds 16 and draw-offs 25, and humidifier lines 22 and 32, one can operate the upper stages in banking mode.

Eventually if the first stages happen also to have hot feed, then heat exchangers 11A and 11B can be recombined in one unit, streams 22A and 22B form only one stream at feed concentration which, after passage through the heat exchanger, is mixed with stream 32C. The resulting stream is then split back to be fed to the first stages. In this case there is no need for the switching of heat exchangers if one stage is down, it is sufficient to shut off 22C.

The disclosed system represents thus an important improvement over existing interconnection schemes for multistage dual temperature isotope enrichment processes. The three major advantages are:

1. The continuous purification of the liquid circulating in the upper stages by a distillation effect.
2. An increased extractive capacity of the upper stages, (at constant gas flow rates) or alternatively a decrease in capital and operating costs of the upper stages (at constant production). Calculations, for a heavy water plant of the type being built at Gentilly Quebec have shown, that other conditions being equal the same extraction and enrichment could be achieved by this process with 8% lower flows on the upper stage than the prior art process.
3. A reduction of heat exchanger area, when compared to prior art design, equal to the heat exchange area of these higher stages in the prior art, other conditions being identical.

I claim:
1. An interconnection arrangement for two stages of a dual temperature isotope exchange apparatus for production of water enriched in deuterium comprising:
    a. a first stage including a cold tower, a dehumidifier, a hot tower, a humidifier, piping means for passing hydrogen sulphide gas through the humidifier, hot tower, dehumidifier, cold tower and recycling to the bottom of the humidifier, a liquid inlet feed to the top of the cold tower, and piping means for passing the liquid from the bottom of the cold tower through the dehumidifier, the hot tower, and the humidifier to a first stage output,
    b. a second stage including a cold tower, a dehumidifier, a hot tower, a humidifier, piping means for passing hydrogen sulphide gas through the humidifier, hot tower, dehumidifier, cold tower and recycling to the bottom of the humidifier, a liquid inlet feed to the top of the cold tower, and piping means for passing the liquid from the bottom of the cold tower through the dehumidifier to a second stage output,
    c. a first heat exchanger,
    d. a second heat exchanger,
    e. a third heat exchanger,
    f. means for taking a minor proportion of the liquid from the first stage output, passing generally equal fractions of this through the said first, second and third heat exchangers in parallel, recombining the fractions and returning to the piping means at a location between first stage hot tower and humidifier,
    g. means for taking a minor proportion of the liquid from the piping between first stage dehumidifier and hot tower, passing a major proportion of this through the first heat exchanger and returning to the top of the second stage humidifier,
    h. means for taking a minor proportion of the liquid from the piping between second stage dehumidifier and hot tower, passing this through the second heat exchanger, returning a major proportion to the top of the second stage dehumidifier, and passing the remainder to an output as product,
    i. means for passing the liquid from the second stage output to the top of the first stage dehumidifier, and
    j. means for taking a minor porportion of the liquid from the bottom of the second stage hot tower, passing through the said third heat exchanger and returning to the top of the second stage cold tower as liquid inlet feed.

* * * * *